United States Patent [19]

Hanada et al.

[11] Patent Number: 5,262,492

[45] Date of Patent: Nov. 16, 1993

[54] SILOXANE-MODIFIED POLYESTER RESINS AND PRODUCTION PROCESSES THEREOF

[75] Inventors: Kazuyuki Hanada, Washinomiya; Iwao Misaizu, Urawa; Akihiko Shibuya, Tokyo; Katsumi Kuriyama, Koshigaya, all of Japan

[73] Assignees: Dainichiseika Color & Chemicals Mfg. Co., Ltd.; Ukima Colour & Chemicals Mfg. Co., Ltd., both of Tokyo, Japan

[21] Appl. No.: 865,862

[22] Filed: Apr. 9, 1992

Related U.S. Application Data

[62] Division of Ser. No. 575,663, Aug. 31, 1990, abandoned.

[51] Int. Cl.$^5$ .................. C08G 63/91; C08L 67/00
[52] U.S. Cl. ........................ 525/415; 528/26; 528/28
[58] Field of Search .................. 528/26, 28; 525/415

[56] References Cited

U.S. PATENT DOCUMENTS

| | | | |
|---|---|---|---|
| 4,033,912 | 7/1977 | Kleimann et al. | 528/28 |
| 4,104,296 | 8/1978 | Pike | 528/38 |
| 4,766,183 | 8/1988 | Rizk et al. | 528/28 |
| 4,812,518 | 3/1989 | Haubennestel et al. | 528/26 |
| 4,942,213 | 7/1990 | Haubennestel et al. | 528/28 |

*Primary Examiner*—Melvyn I. Marquis
*Assistant Examiner*—Karen A. Dean
*Attorney, Agent, or Firm*—Oblon, Spivak, McClelland, Maier & Neustadt

[57] ABSTRACT

Siloxane-modified polyester resins are disclosed. These resins comprise a copolymer of a siloxane compound, which contains at least one active hydrogen atom, and a lactone compound. The copolymer is substantially free of unreacted siloxane compound. The siloxane-modified polyester resins are useful for the production of heat-sensitive recording material, magnetic recording media and release agents. Processes for the production of the siloxane-modified polyester resins are also disclosed.

4 Claims, No Drawings

SILOXANE-MODIFIED POLYESTER RESINS AND PRODUCTION PROCESSES THEREOF

This is a division of application Ser. No. 07/575,663, filed on Aug. 31, 1990 now abandoned.

BACKGROUND OF THE INVENTION

1) Field of the Invention

The present invention relates to polyester resins, and more specifically to siloxane-modified polyester resins excellent not only in non-tacky property, lubricating property, blocking resistance and the like but also in transfer resistance, bleed resistance and the like.

2) Description of the Related Art

Silicon compounds, especially siloxanes (silicone) oils have heretofore found wide-spread utility in application fields such as defoaming agents, release agents, textile treatment agents, various coating agents, paints, inks, and electrical or electronic parts or devices for their excellent properties such as non-tacky property, lubricating property, water repellency, flexibility and heat resistance. Siloxane compounds containing one or more reactive organic functional groups (active hydrogen atom) have also been used, whereby they have also been increasingly employed for the modification of resins and the like and for the treatment of surfaces.

Siloxane-modified resins using such an activehydrogen-atom-containing siloxane compound are satisfactory in non-tacky property, lubricating property, blocking resistance and the like. The siloxane compound used as the modifier however contains one or more non-reactive siloxane compounds, which do not contain any active hydrogen atom, in a relatively high total proportion as impurities. Separation of such nonreactive siloxane compounds is very difficult because the non-reactive compounds and the reactive compound are not substantially different in physical properties.

Such non-reactive siloxane compounds are naturally contained as impurities in a conventional siloxane-modified resin. When a coating is formed with such a siloxane-modified resin, the non-reactive siloxane compounds contained as impurities undergo bleeding to the surface so that various problems are caused. A coating made of a siloxane-modified resin is crosslinked (hardened) with a crosslinking agent (hardening agent) upon its formation in many instances. The non-reactive siloxane compounds contained as impurities in the coating however do not react with the crosslinking agent, whereby the above-described problem of bleeding still occurs. The siloxane compounds thus bled then cause problems such that they may transfer to a material in contact with the coating and may smear the material or, when a magnetic layer of a magnetic recording medium or a back layer of a heat-sensitive recording material is formed with the above modified resin by way of example, they stick on a thermal head and considerably deteriorate the performance of the head.

SUMMARY OF THE INVENTION

An object of the present invention is therefore to provide a siloxane-modified polyester resin excellent not only in non-tacky property, lubricating property, blocking resistance and the like but also in transfer resistance, bleed resistance and the like.

In one aspect of the present invention, there is thus provided a siloxane-modified polyester resin comprising a copolymer of a siloxane compound, which contains at least one active hydrogen atom, and a lactone compound, said copolymer being substantially free of unreacted siloxane compound.

In another aspect of the present invention, there is also provided a process for the production of a siloxane-modified polyester resin substantially free of unreacted siloxane compound, which comprises copolymerizing a siloxane compound, which contains at least one active hydrogen atom, with a lactone compound and then removing any unreacted lactone compound under reduced pressure.

In a further aspect of the present invention, there is also provided a heat-sensitive recording material, magnetic recording medium or release agent, which makes use of the above siloxane-modified polyester resin.

The siloxane compound having at least one active hydrogen atom is converted to a copolymer with the lactone compound by copolymerizing them and processing the resultant product under reduced pressure. The copolymer is not removed under reduced pressure. Any non-reactive siloxane compounds are however not converted to materials of a high molecular weight so that these non-reactive siloxane compounds are removed under reduced pressure. In this manner, such non-reactive siloxane compounds contained in a siloxane compound to be used as a raw material can be eliminated easily, thereby providing a siloxane-modified polyester resin having not only excellent non-tacky property, lubricating property, blocking resistance and the like but also superb transfer resistance, bleed resistance and the like.

The siloxane-modified polyester resin of the invention is therefore very useful as a binder for magnetic layers of magnetic recording media such as magnetic tapes, as back coats formed on the back sides of such magnetic recording media, as a binder for thermal transfer films, as heat-resistant lubricating layers for the prevention of sticking of thermal heads, as synthetic leathers, as textile coating agents, as surface treatment agents, as release layers such as mold release layers, as a binder for paints and printing inks.

The above and other objects, features and advantages of the present invention will become apparent from the following description and the appended claims.

DETAILED DESCRIPTION OF THE INVENTION AND PREFERRED EMBODIMENTS

The invention will hereinafter be described in further detail by preferred embodiments.

The siloxane-modified polyester resin of the invention can be obtained by copolymerizing a siloxane compound, which contains at least one active hydrogen atom, with a lactone compound and then processing the resultant product under reduced pressure.

Preferred examples of the active-hydrogen-atomcontaining siloxane compound employed in the invention includes:

(1) Amino-modified siloxane oils:

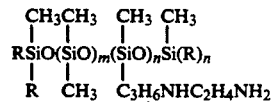

where $m=1-10$, $n=2-10$, and $R=CH_3$ or $OCH_3$.

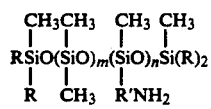

wherein m=1-10, n=2-10, R=CH₃ or OCH₃, and R'=divalent aliphatic group or aliphatic ether group.

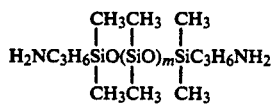

wherein m=0-200.

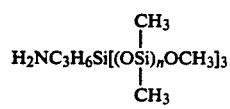

wherein n=2-10.

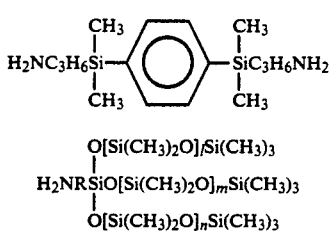

wherein branched sites=2-3, R=lower alkyl, l=2-200, m=2-200, and n=2-200.

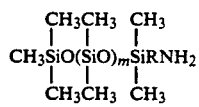

wherein n=1-200, and R=lower alkyl.

(2) Epoxy-modified siloxane oils:

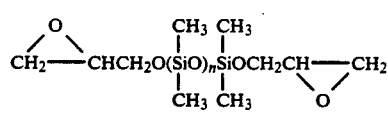

wherein n=1-200.

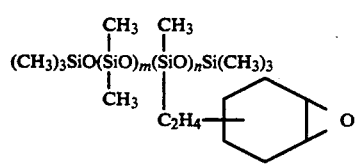

wherein m=1-10, and n=2-10.

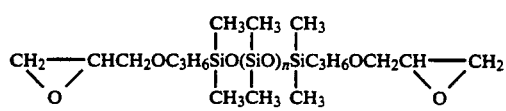

wherein n=1-200.

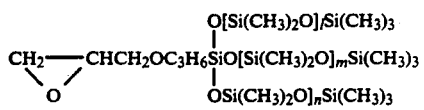

wherein branched sites=2-3, R=lower alkyl, l=2-200, m=2-200, and n=2-200.

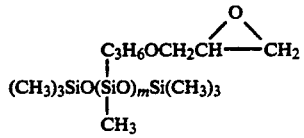

wherein n=1-10.

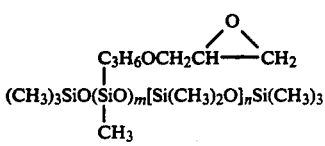

wherein m=1-10, and n=2-10.

The above epoxy compounds can be used after introducing an active hydrogen atom in at least one end thereof by reacting them with a polyol, polyamine, polycarboxylic acid or the like.

(3) Alcohol-modified siloxane oils:

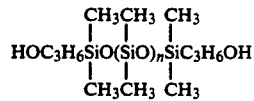

wherein n=1-200.

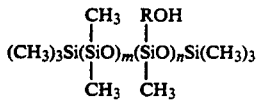

wherein m=1-10, n=2-10, and R=divalent aliphatic group or aliphatic ether group.

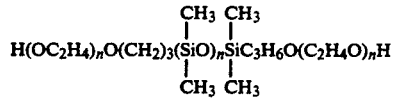

wherein n=0-200.

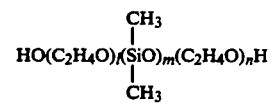

wherein l=1-10, m=10-200, and n=1-5.

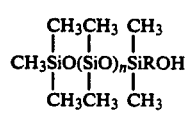

wherein n=1-200, and n=lower alkyl.

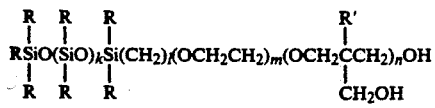

where R=lower alkyl, R'=hydrogen atom or alkyl group, k=1-250, l=0-5, m=0-50, and n=1-5.

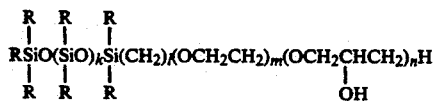

wherein R=lower alkyl, R'=hydrogen atom or alkyl group, K=1-250, l=0-4, m=0-50, and n=2-5.

(4) Mercapto-modified siloxane oils:

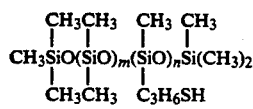

wherein m=1-10, and n=2-10.

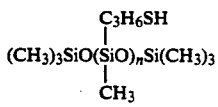

wherein n=2-10.

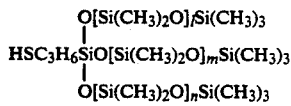

wherein branched sites: 2 or 3, R=lower alkyl, l=2-200, m=2-200, and n=2-200.

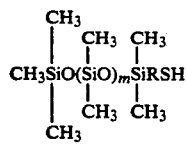

wherein n=1-200, and R=lower alkyl.

(5) Carboxyl-modified siloxane oils:

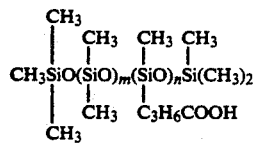

wherein m=1-10, and n=2-10.

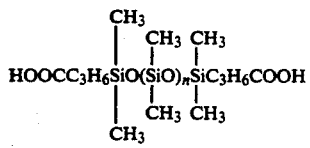

wherein n=1-200.

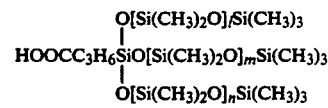

wherein branched sites: 2 or 3, R=lower alkyl, l=2-200, m=2-200, and n=2-200.

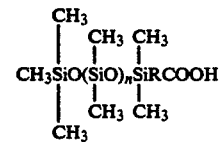

wherein n=1-200, and R=lower alkyl.

It is to be noted that the above active-hydrogenatom-containing siloxane compounds are merely illustrative of siloxane compounds preferred in the invention and the invention is not necessarily limited to such exemplified siloxanes. The above-exemplified compounds and other siloxane compounds are commercially sold these days and are hence readily available on the market. They are all usable in the invention.

The term "lactone compound", which is reacted to the active-hydrogen-atom-containing siloxane compound in the invention, means a lactone compound capable of forming a polyester by conventional ring-opening lactone polymerization, such as ε-caprolactone and δ-valerolactone. Their mono- or di-substituted derivatives such as their mono- or dialkyl-, halogen-, haloalkyl-, alkoxyl- or alkoxyalkyl-substituted derivatives can also be used similarly. Especially preferred lactone compounds are ε-caprolactone and its derivatives.

The reaction between the siloxane compound and the lactone compound is effected by mixing them and then reacting them at 150°–200° C. for several hours to somewhat longer than ten hours, preferably under a nitrogen gas stream while using a suitable catalyst, whereby a desired siloxane-modified polyester copolymer is obtained. It is preferable for the objects of the invention to react them at such a ratio that siloxane segments amount to 5–80 wt % of the resulting copolymer, although they can be reacted at a desired ratio. If the siloxane compound is used in an unduly small proportion, the siloxane-modified polyester resin which is to be obtained eventually will be insufficient in nontacky property and blocking resistance. On the other hand, an unduly large proportion will result in a siloxane-modified polyester resin having reduced film formability and film strength. It is therefore not preferred to use the siloxane compound in such an unduly large or small proportion.

The copolymer obtained as described above contains one or more non-reactive siloxane compounds, which were contained in the siloxane compound employed, as they are. These non-reactive siloxane compounds are contained as impurities, usually accounting for about 1.0–5 wt. % of the copolymer, although this total content varies depending on the kind and proportion of the siloxane compound polymerized.

It is difficult to remove such impurities in the stage of raw material. The present invention has however made it possible to easily remove them by processing the polymerization product under reduced pressure of 10 mmHg or lower, preferably 5 mmHg or lower at about 100°–250° C., preferably in an inert gas atmosphere such as nitrogen gas immediately or sometime after the polymerization, whereby a polyester resin substantially free of unreacted siloxane compounds and useful in the practice of the invention can be obtained. The term "substantially free" as used herein means that the total content of unreacted siloxane compounds is less than 1.0%.

The polyester resin usable in the invention may have a desired molecular weight. Those having a molecular weight in a range of from about 1,000 to 30,000 or so are however preferred in view of the ease and convenience upon use. For the regulation of the molecular weight, a conventional technique can be used as is. The copolymer contains reactive hydroxyl groups at ends thereof so that is can be crosslinked (hardened) with one of various crosslinking agents (hardening agents).

Although the polyester resin usable in the invention can by itself form a coating excellent in nontacky property, lubricating property, blocking resistance and the like but also in transfer resistance, bleed resistance and so on, a crosslinked coating having still better physical properties can be obtained by crosslinking the polyester resin with one of various crosslinking agents upon formation of the coating.

As the crosslinking agent, compounds containing at least two functional groups capable of reacting with terminal hydroxyl groups of the polyester resin, for example, polyisocyanate compounds, polyepoxy compounds and the like can all be used. In addition, crosslinking with a crosslinking agent containing a hydroxyl group, amino group, aldehyde group or the like is also feasible provided that the terminal hydroxyl groups are modified with other functional groups. Particularly preferred crosslinking agents are polyisocyanate compounds.

Conventionally known polyisocyanates are all usable. Preferable exemplary polyisocyanates include 4,4'-diphenylmethanediisocyanate (MDI), hydrogenated MDI, isophorone diisocyanate, 1,3-xylylene diisocyanate, 1,4-xylylene diisocyanate, 2,4-tolylenediisocyanate, 2,6-tolylenediisocyanate, 1,5-naphthalenediisocyanate, m-phenylenediisocyanate and p-phenylenediisocyanate. It is of course possible to use urethane prepolymers which have been obtained by reacting these polyisocyanates with low-molecular-weight polyols or polyamines to form terminate isocyanate groups.

A coating crosslinked by any one of such crosslinking agents is excellent not only in non-tacky property, lubricating property, blocking resistance and the like but also in transfer resistance, bleed resistance and so on and moreover, has high strength.

The present invention will hereinafter be described more specifically by the following examples, comparative examples and application examples, in which all designations of "part or parts" and "%" are on weight basis unless otherwise specifically indicated.

EXAMPLE 1

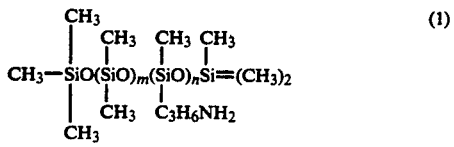

wherein m and n are values to give an amine equivalent of 3,800.

In a reactor equipped with a stirrer, a thermometer, a nitrogen gas inlet tube and a reflux condenser, 240 parts of ε-caprolactone, 100 parts of an amino-modified siloxane oil having the above structure (1) and 0.05 part of tetrabutyl titanate were charged. They were reacted at 180° C. for 10 hours under a nitrogen gas stream. The viscosity of the reaction mixture increased as the reaction proceeded.

The reaction was then continued further at 180° C. under reduced pressure of 5 mmHg for 1 hour, whereby the reaction was completed and, at the same time, non-reactive siloxane compounds contained in the raw material siloxane compound and any unreacted portion of the amino-modified siloxane oil were removed completely. The total amount of removed unreacted siloxane compounds was 15 parts.

The resultant product was a waxy polysiloxanepolyester copolymer having a hydroxyl value of 16 and a melting point of 72° C. The copolymer was dissolved in methyl ethyl ketone to form a 30% solution.

EXAMPLE 2

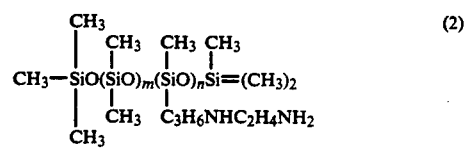

wherein m and n are values to give an amine equivalent of 3,500.

In a similar manner to Example 1, 160 parts of ε-caprolactone, 140 parts of an amino-modified siloxane oil having the above structure (2) and 0.04 part of tetrabutyl titanate were charged and reacted at 180° C. for 10 hours under a nitrogen gas stream. The viscosity of the reaction mixture increased as the reaction proceeded.

The reaction was then continued further at 180° C. under reduced pressure of 5 mmHg for 1 hour, whereby the reaction was completed and, at the same time, non-reactive siloxane compounds contained in the raw material siloxane compound and unreacted portions of the reactants were removed completely. The total amount of removed unreacted siloxane compounds was 18 parts.

The resultant product was a waxy polysiloxane polyester copolymer having a hydroxyl value of 18 and a melting point of 76° C. The copolymer was dissolved in methyl ethyl ketone to form a 30% solution.

EXAMPLE 3

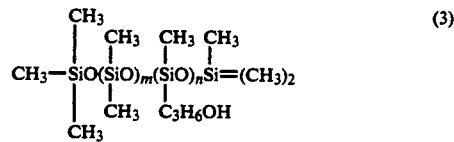

wherein m and n are values to give a hydroxyl value of 25.

In a similar manner to Example 1, 200 parts of ε-caprolactone, 160 parts of an alcohol-modified siloxane oil having the above structure (3) and 0.05 part of tetrabutyl titanate were charged and reacted at 180° C. for 10 hours under a nitrogen gas stream. The viscosity of the reaction mixture increased as the reaction proceeded.

The reaction was then continued further at 180° C. under reduced pressure of 4 mmHg for 1 hour, whereby the reaction was completed and, at the same time, non-reactive siloxane compounds contained in the raw material siloxane compound and unreacted portions of the reactants were removed completely. The total amount of removed unreacted siloxane compounds was 18 parts.

The resultant product was a waxy polysiloxanepolyester copolymer having a hydroxyl value of 12 and a melting point of 78° C. The copolymer was dissolved in methyl ethyl ketone to form a 30% solution.

EXAMPLE 4

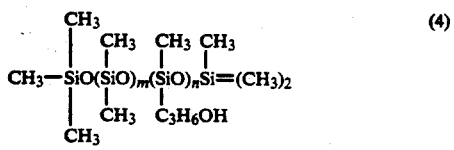
(4)

wherein m and n are values to give a hydroxyl value of 32.

In a similar manner to Example 1, 180 parts of ε-caprolactone, 160 parts of an alcohol-modified siloxane oil having the above structure (4) and 0.04 part of tetrabutyl titanate were charged and reacted at 180° C. for 10 hours under a nitrogen gas stream. The viscosity of the reaction mixture increased as the reaction proceeded.

The reaction was then continued further at 180° C. under reduced pressure of 3 mmHg for 1 hour, whereby the reaction was completed and, at the same time, non-reactive siloxane compounds contained in the raw material siloxane compound and unreacted portions of the reactants were removed completely. The total amount of removed unreacted siloxane compounds was 16 parts.

The resultant product was a waxy polysiloxanepolyester copolymer having a hydroxyl value of 14 and a melting point of 75° C. The copolymer was dissolved in methyl ethyl ketone to form a 30% solution. (Application for the formation of coatings)

EXAMPLES 5–8

Thirty parts of each of the copolymers obtained in Examples 1–4 were dissolved in 70 parts of methyl ethyl ketone. To 100 parts of the resultant solution, an adduct of trimethylol and tolylene diisocyanate at a molar ratio of 1:3 ("Colonate L", trade name; product of Nippon Polyurethane Industry Co., Ltd.; NCO %=13.5) was added in an amount to give an NCO/OH ratio of 1. The resulting coating formulation was coated on a polyester film of 100 μm thick by a gravure coater to give a dry coat thickness of 1 μm, followed by drying in a drier to form a hardened coating.

COMPARATIVE EXAMPLES 1–4

Thirty parts of each of the modified siloxane employed in Examples 1–4 were dissolved in 70 parts of methyl ethyl ketone. To 100 parts of the resultant solution, an adduct of trimethylol and tolylene diisocyanate at a molar ratio of 1:3 ("Colonate L", trade name; product of Nippon Polyurethane Industry Co., Ltd.; NCO %=13.5) was added in an amount to give an NCO/OH ratio of 1. The resulting coating formulation was coated on a polyester film of 100 μm thick by a gravure coater to give a dry coat thickness of 1 μm, followed by drying in a drier to form a hardened coating.

COMPARATIVE EXAMPLE 5

In 1,000 parts of toluene, were dissolved 100 parts of a silicone resin ("KS-841", trade name; product of Shin-Etsu Chemical Co., Ltd.) and 1 part of a catalyst ("PL-7", trade name; product of Shin-Etsu Chemical Co., Ltd.). Using the resultant solution, a hardened coating was formed on a polyester film in a similar manner to Example 5 except that the drying temperature was changed to 170° C. in accordance with the manufacturer's application guideline for the silicone resin.

EVALUATION 1

Each of the coated films obtained in Examples 5–8 and Comparative Examples 1–5, respectively was cut into a predetermined shape. An uncoated polyester film was superposed on the surface of the hardened coating of the coated film. While a load (2 kg/cm²) was applied from the top, the thus-superposed films were left over for 3 days in an atmosphere of 50° C. The uncoated film was then peeled off, and a wettability test of tis surface which had been maintained in contact with the hardened coating of the coated film was conducted in accordance with JIS K6768. In addition, the surface tension of the surface of the uncoated film was also measured. The results are shown in Table 1.

TABLE 1

| Sample | Surface tension (dyne/cm) |
|---|---|
| Blank* | 41 |
| Example 5 | 39 |
| Example 6 | 39 |
| Example 7 | 40 |
| Example 8 | 40 |
| Comp. Ex. 1 | 31 |
| Comp. Ex. 2 | 31 |
| Comp. Ex. 3 | 32 |
| Comp. Ex. 4 | 32 |
| Comp. Ex. 5 | 31 |

In the above table, smaller values indicate more transfer of unreacted siloxane compounds to the back sides.

EVALUATION 2

Each of the coating formulations prepared in Examples 5–8 and Comparative Examples 1–5, respectively was coated by a gravure coater onto the back side of a 6.0-μm thick polyester film, which had a heat-sensitive recording layer formed in advance on the front side thereof, to give a dry coat thickness of 0.5 μm. The solvent was then caused to evaporate in a drier, whereby a heat-resistant lubricating layer was formed. The thus-coated polyester film was cut in a predetermined width, so that a thermal recording material using the modified resin of the invention and a comparative thermal recording material were obtained. Recording was performed using on a thermal printer. The results are summarized in Table 2.

TABLE 2

| | Coefficient of friction | Sticking property | Head smear | Transfer to the back (dyne/cm) |
|---|---|---|---|---|
| Ex. 5 | 0.157 | 5 | 5 | 40 |
| Ex. 6 | 0.125 | 5 | 5 | 40 |
| Ex. 7 | 0.175 | 5 | 5 | 39 |

TABLE 2-continued

| | Coefficient of friction | Sticking property | Head smear | Transfer to the back (dyne/cm) |
|---|---|---|---|---|
| Ex. 8 | 0.166 | 5 | 5 | 40 |
| Comp. Ex. 1 | 0.146 | 5 | 2 | 31 |
| Comp. Ex. 2 | 0.110 | 5 | 2 | 30 |
| Comp. Ex. 3 | 0.138 | 5 | 2 | 32 |
| Comp. Ex. 4 | 0.113 | 5 | 2 | 31 |
| Comp. Ex. 5 | 0.141 | 5 | 2 | 30 |

*Without heat-resistant lubricating layer

The coefficients of friction in Table 2 were each the measurement value of coefficient of friction between an untreated surface of a polyethylene terephthalate and the heat-resistant lubricating layer formed in the corresponding example or comparative example.

The sticking property was evaluated by subjecting each thermal recording material to a thermal recording test on an actual thermal printer and visually ranking in 5 stages the separability of the thermal recording material from the thermal head when the thermal head was repeatedly pressed against the thermal recording material. The thermal recording materials showed the best separability were ranked 5.

The head smear was evaluated by subjecting each thermal recording material to a thermal recording test on an actual thermal printer and visually observing the state of smear of the thermal head. The ranking was in 5 stages with 5 indicating the least smear.

Each transfer to the back side is expressed in terms of coefficient of friction measured under the conditions of 50° C.-3 days. The smaller the coefficient of friction, the less the transfer and hence the better.

It is therefore clearly understood from the foregoing results that a heat-sensitive recording material using a siloxane modified polyester resin of the invention is significantly improved in both head smear and transfer to the back although the coefficient of friction of its heat-resistant lubricating layer becomes slightly greater. (Application examples as magnetic layers in magnetic recording media)

COMPARATIVE EXAMPLE 6

In 412 parts of methyl ethyl ketone, 150 parts of polybutylene adipate containing hydroxyl groups at ends thereof and having a molecular weight of 2,000, 20 parts of 1,3-butyleneglycol and 52 parts of tolylene diisocyanate were subjected to an addition reaction. A polyester resin solution (solid content: 30%) having a viscosity of 200 poises at 20° C. was obtained.

COMPARATIVE EXAMPLE 7

A methyl ethyl ketone solution (solid content: 30%) of a vinyl chloride/vinyl acetate/vinyl alcohol copolymer resin ("Eslec A", trade name; product of Sekisui Chemical Co., Ltd.).

COMPARATIVE EXAMPLE 8

A methyl ethyl ketone solution (solid content: 30%) of a butyral resin ("Eslec B", trade name; product of Sekisui Chemical Co., Ltd.).

REFERENTIAL EXAMPLE 1

Preparation of dispersion

A coating formulation for the formation of magnetic layers was prepared by mixing the following components:

| | |
|---|---|
| Co-containing $Fe_2O_3$ | 100 parts |
| Polyester-type polyurethane resin (35% solution) | 54 parts |
| Binder solution of each of Examples 1-4 and Comparative Examples 6-8 (30% solution) | 20 parts |
| Dispersant (lecithin) | 1 part |
| Carbon black | 5 parts |
| Nitrocellulose | 6 parts |
| Methyl ethyl ketone | 270 parts |

The above components were mixed and then kneaded for 50 hours in a ball mill. Eight parts of "Colonate L" were added further, followed by kneading for further 3 hours. The thus-kneaded mass was passed through a filter so that a dispersion of magnetic particles was obtained.

EXAMPLES 9-12 AND COMPARATIVE EXAMPLES 9-11

The dispersions obtained in Referential Example 1 were separately coated to a thickness of 5 μm on 15-μm thick polyester films by a reverse roll coater. After the solvent was evaporated, the coated surfaces were processed by a super calender roll. The resultant coated films were slit into a prescribed width, whereby magnetic recording media of invention examples and comparative examples were obtained.

USE EXAMPLE 1

The performance of each of the magnetic recording media of Examples 9-12 and Comparative Examples 9-11 was investigated. The results are summarized in Table 3.

Coefficient of friction (A) is a value (μk) measured between each magnetic layer and the associated support (base film). The other performance characteristics, namely, tape squeak during 200-times running (B), lateral jittering (C), irregular winding upon fast tape feeding (D) and wearing of magnetic layer (E) were observed by subjecting each magnetic recording medium as a video tape to the respective tests on an actual video tape recorder. The overall evaluation results are shown in column F.

TABLE 3

| Characteristic Recording medium | A | B | C | D | E | F |
|---|---|---|---|---|---|---|
| Example 9 | 0.21 | Not observed | Not observed | Not observed | Not observed | Good |
| Example 10 | 0.19 | Not observed | Not observed | Not observed | Not observed | Good |
| Example 11 | 0.10 | Not observed | Not observed | Not observed | Not observed | Good |
| Example 12 | 0.12 | Not | Not | Not | Not | Good |

TABLE 3-continued

| Characteristic Recording medium | A | B | C | D | E | F |
|---|---|---|---|---|---|---|
| | | observed | observed | observed | observed | |
| Comparative Example 9 | 0.52 | Observed | Observed | Observed | Observed | Poor |
| Comparative Example 10 | 0.26 | Slightly observed | Not Observed | Not observed | Slightly observed | Slightly good |
| Comparative Example 11 | 0.33 | Slightly observed | Slightly observed | Slightly observed | Slightly observed | Slightly good |

It is easily understood from the above results that magnetic recording media according to the invention have a magnetic layer having a small coefficient of friction and show excellent running characteristics. (Application examples as back layers in magnetic recording media)

COMPARATIVE EXAMPLE 12

In 412 parts of methyl ketone, 150 parts of polybutylene adipate containing hydroxyl groups at ends thereof and having a molecular weight of 2,000, 20 parts of 1,3-butyleneglycol and 52 parts of tolylene diisocyanate were subjected to an addition reaction, whereby a resin solution (solid content: 30%) having a viscosity of 200 poises at 20° C. was obtained.

COMPARATIVE EXAMPLE 13

A methyl ethyl ketone solution (solid content: 30%) of a vinyl chloride/vinyl acetate/vinyl alcohol copolymer resin ("Eslec A", trade name; product of Sekisui Chemical Co., Ltd.).

COMPARATIVE EXAMPLE 14

A methyl ethyl ketone solution (solid content: 30%) of a butyral resin ("Eslec B", trade name; product of Sekisui Chemical Co., Ltd.).

REFERENTIAL EXAMPLE 2

Preparation of coating formulation

The following components were mixed to prepare a coating formulation for back layers:

| | |
|---|---|
| Binder solution of each of Examples 1–4 and Comparative Examples 12–14 (30% solution) | 100 parts |
| Polyester resin ("Vyron-200, trade name; product of Toyobo Co., Ltd.) | 5 parts |
| "Colonate L" (trade name; product of Nippon Polyurethane Industry Co., Ltd.) | 2 parts |
| Methyl ethyl ketone | 1200 parts |

EXAMPLES 13–16 AND COMPARATIVE EXAMPLES 15–17

The coating formulations obtained in Referential Example 2 were separately coated on 15-μm thick polyester films by a reverse roll coater to give a dry coat thickness of 1 μm. The solvent was evaporated so that back layers were formed. Using a dispersion containing Co-containing $Fe_2O_3$ and a binder resin which was formed of a conventional resin and a vinyl chloride copolymer resin, a magnetic layer was next formed on the opposite sides by a method known per se in the art. The thus-coated films were separately slit in a prescribed width, whereby magnetic recording media of the examples and comparative examples were obtained.

USE EXAMPLE 2

The performance of each of the magnetic recording media of Examples 13–16 and Comparative Examples 15–17 was investigated. The results are summarized in Table 4.

Coefficient of friction (A) is a value (μk) measured between each magnetic layer and the associated back layer. The other performance characteristics, namely, tape squeak during 200-times running (B), lateral jittering (C), irregular winding upon fast tape feeding (D) and wearing of back layer (E) were observed by subjecting each magnetic recording medium as a video tape to the respective tests on an actual video tape recorder. The overall evaluation results are shown in column F.

TABLE 4

| Characteristic Recording medium | A | B | C | D | E | F |
|---|---|---|---|---|---|---|
| Example 13 | 0.13 | Not observed | Not observed | Not observed | Not observed | Good |
| Example 14 | 0.20 | Not observed | Not observed | Not observed | Not observed | Good |
| Example 15 | 0.23 | Not observed | Not observed | Not observed | Not observed | Good |
| Example 16 | 0.12 | Not observed | Not observed | Not observed | Not observed | Good |
| Comparative Example 15 | 0.33 | Slightly observed | Not observed | Slightly observed | Slightly observed | Slightly poor |
| Comparative Example 16 | 0.31 | Slightly observed | Not observed | Slightly observed | Slightly observed | Slightly poor |
| Comparative Example 17 | 0.35 | Slightly observed | Not observed | Slightly observed | Slightly observed | Slightly poor |

It is easily understood from the above results that magnetic recording media according to the invention have a back layer having a small coefficient of friction and show excellent running characteristics. (Application examples as release agents)

COMPARATIVE EXAMPLE 18

In 1,000 parts of toluene, 100 parts of a silicone resin ("KS-841", trade name; product of Shin-Etsu Chemical Co., Ltd.) and 1 part of a catalyst ("PL-7", trade name; product of Shin-Etsu Chemical Co., Ltd.) were dissolved. Using the solution, a hardened coating was formed on a polyester film in a similar manner to Example 5 except that the drying temperature was changed to 170° C. in accordance with the manufacturer's application guideline for the silicone resin.

EXAMPLES 17–20 AND COMPARATIVE EXAMPLES 19–20

Each of the following release treatment agents of Examples 17–20 and Comparative Examples 19–20 was coated evenly on one side of a polyvinyl chloride film of 50 μm thick to give a solid coat weight of 0.6 g/m². The thus-coated film was heated and dried at 80° C. for 30 seconds, whereby a sample having a release coating layer was prepared. Incidentally, the polyvinyl chloride film was softened and was unable to maintain its shape as a film when the temperature was set at a high temperature of 100° C. or higher.

An acrylic adhesive tape of 20 mm wide (product of Sekisui Chemical Co., Ltd.) was pressed and adhered by a rubber roller having a deadweight of 2 kg to the coated base material prepared as described above. After leaving them for 1 day at room temperature (20° C., humidity: 52%) and for 3 days at a high temperature (40° C., humidity: 90% min.), the release property, the residual adhesive force, the percent retention of residual adhesive force, the separation tendency of the release coating layer and the writing quality with a quick-drying felt pen were measured. The results are summarized in Table 5.

| | |
|---|---|
| Example 17 | |
| Resin solution of Example 1 | 100 parts |
| "Colonate L" (trade name for trimethylolpropane-TDI adduct) | 2 parts |
| Methyl ethyl ketone | 250 parts |
| Example 18 | |
| Resin solution of Example 2 | 100 parts |
| Fluoroplastic powder ("Lubron L-2", trade name; product of Daikin Industries, Ltd.) | 5 parts |
| "Colonate L" | 2 parts |
| Methyl ethyl ketone | 250 parts |
| Example 19 | |
| Resin solution of Example 3 | 100 parts |
| "Colonate L" | 2 parts |
| Methyl ethyl ketone | 250 parts |
| Example 20 | |
| Resin solution of Example 4 | 100 parts |
| "Colonate L" | 2 parts |
| Silicone resin powder ("Tospearl 120", trade name; product of Toshiba Silicone Co., Ltd.) | 5 parts |
| Methyl ethyl ketone | 250 parts |
| Comparative Example 19 | |
| Compound of structural formula (1) of Example 1 | 100 parts |
| "Colonate L" | 2 parts |
| Methyl ethyl ketone | 250 parts |
| Comparative Example 20 | |
| Silicone resin ("KS-841", trade name; product of Shin-Etsu Chemical Co., Ltd.) | 100 parts |
| Catalyst ("PL-7", trade name; product of Shin-Etsu Chemical Co., Ltd.) | 1 part |
| Toluene | 1,000 parts |

Evaluation of the individual property was conducted in accordance with the following methods:

Release property

An adhesive tape of 20 mm wide was adhered at each release coating layer. After they were stored at 40° C. for 24 hours under a load of 20 g/cm², the adhesive tape was pulled off at an angle of 180° and a velocity of 300 mm/min, whereby the force required to peel off the adhesive tape was measured in terms of grams at 20° C.

Residual adhesive force

The adhesive tape after the above-described measurement of the release property was adhered to a stainless steel plate #280. A tape roller of 2 kg was reciprocated once on the adhesive tape. After 30 minutes, the adhesive tape was pulled off at an angle of 180° and a velocity of 300 mm/min, whereby the force required to peel off the adhesive tape was measured in terms of grams at 20° C.

Percent retention of residual adhesive force

The residual adhesive force is indicated in terms of percentage with 100% for the adhesive force (320 g/20 mm) to a stainless steel plate #280 upon adhesion of a clean adhesive tape, which had not be subjected to peeling resistance, to the stainless steel plate.

Separation tendency

A separation tendency test of each release coating layer was conducted on a sample which had been prepared by once reciprocating gauze under a load of 50 g/cm² on the release coating layer.

Writing quality with quick-drying felt pen

Letters were written with a commercial oil-base quick-drying felt pen on each release coating layer. Investigation was made as to whether the ink was repelled or not upon writing.

TABLE 5

| | Example | | | | Comp. Ex. | |
|---|---|---|---|---|---|---|
| | 17 | 18 | 19 | 20 | 19 | 20 |
| Peeling force (g/20 mm) | | | | | | |
| After 1 day at room temperature (20° C., 52%) | 17 | 12 | 15 | 14 | 44 | 21 |
| After 3 days at high temp. (40° C., 90% min.) | 20 | 18 | 22 | 19 | 23 | 11 |
| Residual adhesive force (g/20 mm) | | | | | | |
| After 1 day at room temperature (20° C., 52%) | 282 | 310 | 305 | 301 | 222 | 209 |
| After 3 days at high temp. (40° C., 90% min.) | 272 | 290 | 293 | 299 | 187 | 155 |
| Percent retention of residual adhesive force (%) | | | | | | |
| After 1 day at room temperature (20° C., 52%) | 89 | 92 | 94 | 94 | 70 | 64 |
| After 3 days at high temp. (40° C., 90% min.) | 86 | 90 | 92 | 91 | 57 | 47 |

TABLE 5-continued

| | Example | | | | Comp. Ex. | |
|---|---|---|---|---|---|---|
| | 17 | 18 | 19 | 20 | 19 | 20 |
| Separation tendency | | | | | | |
| After 1 day at room temperature (20° C., 52%) | N* | N | N | N | S** | S |
| Writing quality by quick-drying felt pen | | | | | | |
| After 1 day at room temperature (20° C., 52%) | Good | Good | Good | Good | Poor | Poor |

*Not separated,
**Separated.

We claim:

1. A siloxane-modified polyester resin crosslinked with a polyisocyanate compound obtained from a copolymer of a siloxane compound, which contains at least one active hydrogen atom, with a lactone compound and a crosslinking amount of a polyisocyanate compound, said copolymer being substantially free of unreacted siloxane compound.

2. The resin of claim 1, wherein siloxane segments account for 5-80 wt. % of the copolymer.

3. A process for the production of a siloxane-modified polyester resin substantially free of unreacted siloxane compound crosslinked with a polyisocyanate compound, which comprises copolymerizing a siloxane compound, which contains at least one active hydrogen, with a lactone compound and then removing any unreacted siloxane compound under reduced pressure, and thererafter crosslinking the resulting siloxane-modified polyester resin with a crosslinking amount of a polyisocyanate compound.

4. A release agent comprising a resin which contains siloxane segments, wherein the resin is the siloxane-modified polyester resin according to claim 1.

* * * * *